(12) United States Patent
Renzi

(10) Patent No.: US 7,182,371 B1
(45) Date of Patent: *Feb. 27, 2007

(54) EDGE COMPRESSION MANIFOLD APPARATUS

(75) Inventor: Ronald F. Renzi, Tracy, CA (US)

(73) Assignee: Sandia National Laboratories, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/999,828

(22) Filed: Nov. 30, 2004

Related U.S. Application Data

(63) Continuation of application No. 10/350,628, filed on Jan. 24, 2003, now Pat. No. 6,832,787.

(51) Int. Cl.
*F16L 39/00* (2006.01)

(52) U.S. Cl. .................. 285/124.1; 285/143.1

(58) Field of Classification Search ............. 285/124.1, 285/124.2, 124.3, 124.4, 124.5, 143.1, 332.1
See application file for complete search history.

(56) References Cited

U.S. PATENT DOCUMENTS

| | | | |
|---|---|---|---|
| 3,677,577 A | 7/1972 | Krauer et al. | |
| 4,026,803 A * | 5/1977 | Abrahams et al. | 210/198.2 |
| 4,089,549 A | 5/1978 | Vyse et al. | |
| 4,451,363 A * | 5/1984 | Brownlee et al. | 210/198.2 |
| 4,792,396 A * | 12/1988 | Gundelfinger | 210/198.2 |
| 4,915,419 A | 4/1990 | Smith, III | |
| 4,995,646 A | 2/1991 | Johnston et al. | |
| 5,209,525 A | 5/1993 | Ito | |
| 5,227,059 A * | 7/1993 | Shepherd | 210/198.2 |
| 5,366,620 A | 11/1994 | Schick | |
| 5,419,208 A | 5/1995 | Schick | |
| 5,472,598 A | 12/1995 | Schick | |
| 5,482,628 A | 1/1996 | Schick | |
| 5,487,569 A | 1/1996 | Silvis et al. | |
| 5,494,641 A | 2/1996 | Krstanovic | |
| 5,534,152 A | 7/1996 | Schick | |
| 5,540,464 A | 7/1996 | Picha | |
| 5,644,395 A | 7/1997 | Folta | |
| 5,736,036 A | 4/1998 | Upchurch et al. | |
| 5,846,396 A | 12/1998 | Zanzucchi et al. | |
| 5,855,229 A | 1/1999 | Gluf, Jr. | |
| 5,865,474 A | 2/1999 | Takahashi | |
| 5,911,954 A * | 6/1999 | Ford et al. | 422/101 |
| 5,987,735 A | 11/1999 | Horning et al. | |
| 5,988,703 A | 11/1999 | Craig | |

(Continued)

*Primary Examiner*—James M. Hewitt
(74) *Attorney, Agent, or Firm*—Cascio, Schmayer & Zervas

(57) ABSTRACT

A manifold for connecting external capillaries to the inlet and/or outlet ports of a microfluidic device for high pressure applications is provided. The fluid connector for coupling at least one fluid conduit to a corresponding port of a substrate that includes: (i) a manifold comprising one or more channels extending therethrough wherein each channel is at least partially threaded, (ii) one or more threaded ferrules each defining a bore extending therethrough with each ferrule supporting a fluid conduit wherein each ferrule is threaded into a channel of the manifold, (iii) a substrate having one or more ports on its upper surface wherein the substrate is positioned below the manifold so that the one or more ports is aligned with the one or more channels of the manifold, and (iv) device to apply an axial compressive force to the substrate to couple the one or more ports of the substrate to a corresponding proximal end of a fluid conduit.

25 Claims, 2 Drawing Sheets

U.S. PATENT DOCUMENTS

| | | |
|---|---|---|
| 6,083,763 A | 7/2000 | Balch |
| 6,086,825 A | 7/2000 | Sundberg et al. |
| 6,090,251 A | 7/2000 | Sundberg et al. |
| 6,102,449 A | 8/2000 | Welsh |
| 6,102,897 A | 8/2000 | Lang |
| 6,129,331 A | 10/2000 | Henning et al. |
| 6,162,362 A * | 12/2000 | Ma et al. .................... 210/656 |
| 6,190,616 B1 | 2/2001 | Jovanovich et al. |
| 6,224,728 B1 | 5/2001 | Oborny et al. |
| 6,267,143 B1 | 7/2001 | Schick |
| 6,293,725 B1 | 9/2001 | Winkvist |
| 6,312,960 B1 | 11/2001 | Balch et al. |
| 6,319,476 B1 | 11/2001 | Victor, Jr. et al. |
| 6,344,145 B1 | 2/2002 | Garguilo et al. |
| 6,358,387 B1 | 3/2002 | Kopf-Sill et al. |
| 2001/0045235 A1 | 11/2001 | Schick |

* cited by examiner

EDGE COMPRESSION MANIFOLD APPARATUS

CLAIM OF PRIORITY AND CROSS REFERENCE TO RELATED APPLICATION

This application is a Continuation of U.S. patent application Ser. No. 10/350,628, filed Jan. 24, 2003, now U.S. Pat. No. 6,832,787 B1, which is hereby incorporated by reference in its entirety.

This invention was made with Government support under Contract No. DE-AC04-94AL85000 awarded by the U.S. Department of Energy to Sandia Corporation. The Government has certain rights to the invention.

FIELD OF THE INVENTION

The present invention relates generally to microfluidic systems and more particularly to structures which facilitate the introduction of fluids into devices having microfluidic channels.

BACKGROUND OF THE INVENTION

Devices for performing chemical analysis have in recent years become miniaturized. For example, microfluidic devices have been constructed using microelectronic fabrication and micromachining techniques on planar substrates such as glass or silicon which incorporate a series of interconnected channels or conduits to perform a variety of chemical analysis such as capillary electrophoresis (CE) and high-performance liquid chromatography (HPLC).

Microfluidic substrates have networks of chambers connected by channels which have mesoscale dimensions, where at least one dimension is usually between 0.1 microns and 500 microns. Such microfluidic substrates may be fabricated using photolithographic techniques similar to those used in the semi-conductor industry, and the resulting devices can be used in perform a variety of sophisticated chemical and biological analytical techniques. Microfluidic analytical technology has a number of advantages, including the ability to use very small sample sizes, typically on the order of nanoliters. The substrates may be produced at a relatively low cost, and can be formatted to perform numerous specific analytical operations, including mixing, dispensing, valving, reactions, and detections.

Another recently developed class of sample-receiving microfluidic substrates includes substrates having a capillary interface that allows compounds to be brought onto the test substrate from an external source, and which can be advantageously used in a number of assay formats for high-throughput screening applications. These assay formats include fluorogenic assays, fluorescence polarization assays, non-fluorogenic mobility shift assays, dose response assays, and calcium flux cell-based assays.

Other applications for microfluidic devices include diagnostics involving biomolecules and other analytical techniques such as micro total analysis systems. Such devices, often referred to in the art as "microchips," also may be fabricated from plastic, with the channels being etched, machined or injection molded into individual substrates. Multiple substrates may be suitably arranged and laminated to construct a microchip of desired function and geometry. In all cases, the channels used to carry out the analyses typically are of capillary scale dimension.

To fully exploit the technological advances offered by the use of microfluidic devices and to maintain the degree of sensitivity for analytical techniques when processing small volumes, e.g., microliters or less, connectors which introduce and/or withdraw fluids, i.e., liquids and gases, from the device, as well as interconnect microfluidic devices, are a crucial component in the use and performance of the microfluidic device.

A common technique used in the past involves bonding a length of tubing to a port on the microfluidic device with epoxy or other suitable adhesive. Adhesive bonding is unsuitable for many chemical analysis applications because the solvents used attack the adhesive which can lead to channel clogging, detachment of the tubing, and/or contamination of the sample and/or reagents in or delivered to the device. Furthermore, adhesive bonding results in a permanent attachment of the tubing to the microfluidic device which makes it difficult to change components, i.e., either the microfluidic device or the tubing, if necessary. Thus assembly, repair and maintenance of such devices become labor and time intensive, a particularly undesirable feature when the microfluidic device is used for high throughput screening of samples such as in drug discovery.

To avoid problems associated with adhesive bonding, other techniques have been proposed in the past, e.g., press fitting the tubing into a port on the microfluidic device. However, such a connection typically is unsuitable for high-pressure applications such as HPLC. Additionally, pressing the tubing into a port creates high stress loads on the microfluidic device which could lead to fractures of the channels and/or device.

Other methods involved introducing liquids into an open port on the microfluidic device with the use of an external delivery system such as a pipette. However, this technique also is undesirable due to the possibility of leaks and spills which may lead to contamination. In addition, the fluid is delivered discretely rather than continuously. Moreover, the use of open pipetting techniques does not permit the use of elevated pressure for fluid delivery such as delivered by a pump, thereby further restricting the applicability of the microfluidic device.

Microfluidic devices generally comprise an array of micron-sized wells or reservoirs and interconnecting channels disposed on a substrate. The wells are connected to distribution means for dispensing fluids to and collecting fluids from the array. Connection to the wells is typically by means of a micropipette end. While this serves for benign addition of fluids this means of fluid addition cannot be used for those applications where the access ports are exposed to a pressure differential or where it is desired to connect capillary tubes to fluid wells.

Therefore, a need exists for an improved microfluidic connector which is useful with all types of microfluidic devices and provides an effective, high pressure, low fluid dead volume seal. Specifically, there is a need for the connector that functions as a manifold which enables a combination of flow streams from a plurality of input capillaries to channel into a single capillary tube or splitting a flow stream, from a single capillary into a multiple flow streams. Finally, it is desirable that the connector has negligible dead volume.

SUMMARY OF THE INVENTION

The invention is based in part on the development of a manifold for connecting external capillaries to the inlet and/or outlet ports of a microfluidic device for pressure applications.

In one aspect, the invention is directed to a fluid connector for coupling at least one fluid conduit to a corresponding port of a substrate that includes:

a manifold comprising one or more channels extending therethrough wherein each channel is at least partially threaded;

one or more threaded ferrules each defining a bore extending therethrough with each ferrule supporting a fluid conduit wherein each ferrule is threaded into a channel of the manifold;

a substrate having one or more ports on its upper surface wherein the substrate is positioned below the manifold so that the one or more ports is aligned with the one or more channels of the manifold; and means for applying an axial compressive force to the substrate to couple the one or more ports of the substrate to a corresponding proximal end of a fluid conduit.

In one preferred embodiment, the fluid connector includes:

a base plate that is rigidly fastened to and spaced apart from the manifold and which is positioned below the substrate; and a pressure plate that is interposed between the substrate and the base plate wherein the pressure plate includes one or more adjustable screws for maintaining an upward axial force on the substrate.

DESCRIPTION OF THE PREFERRED EMBODIMENTS

The invention is directed to techniques for connecting multiple external capillary tubes to the microchannels of a microscale analytic device. The invention is particularly suited for analysis operations that are desirably carried out on microscale devices and that require the application of high pressures. The compression manifold device is expected to withstand pressures of up to at least about 500 psi. As used herein, "microfluidic" channel, or "microchannel" is a channel, e.g., sealed enclosed groove, depression, tube, capillary which is adapted to handle small volumes of fluid. Typically, the microchannel has at least one subsection with at least one cross-sectional dimension of between about 0.1 microns and 500 microns, and typically less than 100 microns.

Figure 1:
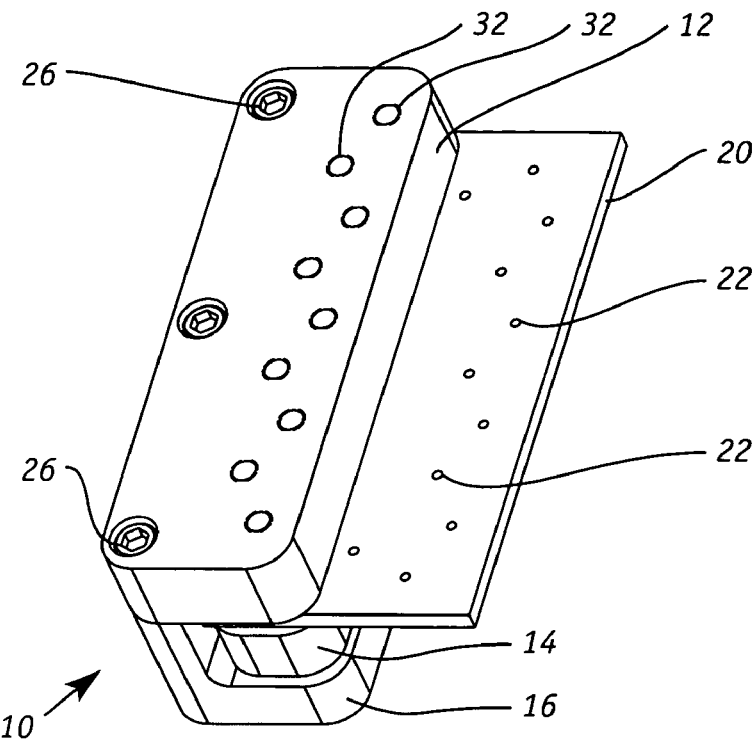
FIGS. 1, 2 and 3 are perspective, front elevational, and side elevational views, respectively, of one embodiment of the edge compression manifold device.
Figure 2:
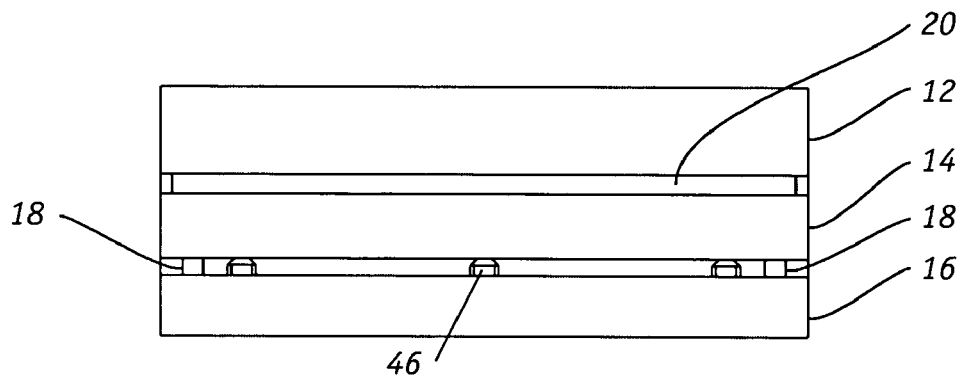
Figure 3:
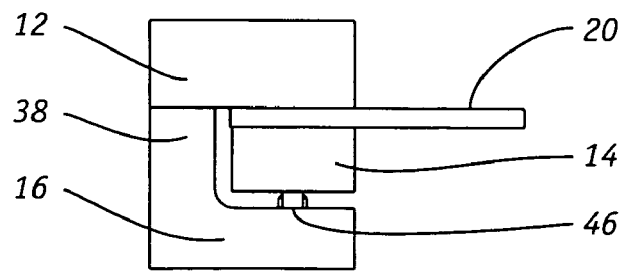

FIGS. 1, 2, and 3 illustrate an edge compression manifold device 10 for connecting external liquid flow streams to a substrate 20 which can be any preferably substantially planar microfluidic member that has an integrated network of microfluidic channels (not shown) disposed therein. The particular design or configuration of the internal structure of the substrate is not critical. Such substrates are also referred to as microfluidic wafers or chips. The substrate is preferably fabricated from glass, quartz, silicon or plastic by conventional techniques including LIGA (an acronym for the German for lithography, electroplating, and molding), deep x-ray lithography, silicon surface micromachining and lithography, electric discharge machining, and direct laser additive fabrication. In addition, commercially available substrates can be modified with appropriate dimensioned inlet and/or outlet ports as further described herein. The substrate may include reaction cells, reservoirs, and other structures that are interconnected by a network of microchannels and a series of micropumps. Such substrates are further described, for example, in U.S. Pat. No. 5,846,396 to Zanzuchi, et al., which is incorporated herein.

Substrate 20 includes a plurality of inlet and/or outlet ports 22 that enable fluid communication with microchannels within the substrate. For example, one or more of ports 22 can be employed as inlets to introduce reagents and cleaning solvents into substrate 20 while other ports 22 can be employed as outlets to remove products and solvents following a flush of the system. Inlet ports can be connected to the appropriate sources of reagents through external capillaries and pumps. Conventional mechanical pumps can be employed although a preferred method employs a high pressure hydraulic system that has no moving parts for converting electric potential to hydraulic force and for manipulating fluids which are described in U.S. Pat. No. 6,013,164 to Paul, et al., U.S. Pat. No. 6,019,882 to Paul, et al., U.S. Pat. No. 6,224,728 to Oborny and U.S. Pat. No. 6,277,257 and U.S. Pat. No. 6,209,909 both to Paul, et al., which are incorporated herein by reference.

Device 10 further includes manifold 12, base plate 16, and movable slide pressure plate 14 which is positioned between manifold 12 and base plate 16. As shown in further detail in the cross sectional view of FIG. 4, the manifold 12 includes a plurality of threaded, tapered channels 36 that run through the manifold. Each threaded channel 36 has an upper aperture 32 on the upper surface of manifold 12 and a lower aperture 24 on the lower surface of manifold. Concentric with each lower aperture 24 on the underside of manifold 12 is a groove that is fitted with an o-ring 28 that provides a fluid-tight seal between substrate 20 and manifold 12. The o-rings can be made of any suitable deformable material such as natural rubber or silicone.

As shown in FIG. 1, the threaded channels are preferably arranged within manifold so that the upper apertures 32 are sufficiently spaced apart for easy access. As is evident, the staggered arrangement for upper apertures 32 has a corresponding staggered arrangement for lower apertures 24 on the manifold's lower surface. Preferably, the manifold is made of a material such as polyether ether ketone (PEEK) or other suitable polymer.

Substrate 20 is disposed or inserted between slide pressure plate 14 and manifold 12 which is fastened to base plate 16 by screws 26. Substrate 20 has an array of outlet and/or inlet ports 22 on its surface which are connected to an integrated network of microfluidic channels (not shown) within substrate 20. As shown in FIG. 3, in this embodiment, base plate 16 has an "L" configuration with a back support region 38 that abuts the lower surface of manifold 12. Base plate 16 also supports slide pressure plate 14. As discussed above, the lower surface of manifold 12 includes an arrangement of lower apertures 24.

To use the inventive edge the compression manifold, at least one of the lower apertures 24 (FIG. 4) of manifold 12 should be aligned with one of the ports 22 of substrate 20. In one embodiment, a dedicated manifold can be configured with a specific array of lower apertures 24 with a pattern that matches an array of ports 22 of a particular substrate so that all the ports 22 are aligned with corresponding lower apertures 24. In this fashion, different substrates can be identified by their specific port arrangements. Using dedicated manifolds avoids mismatching manifolds with different substrates. Alternatively, an edge compression manifold can have different sets of array of lower aperture patterns to accommodate different substrates each with different port arrangements.

As shown in FIG. 2, one or more guide pins 18 are disposed on either end of base plate 16 to position slide pressure plate 14 properly into place. One or more screws 46 are mounted into base plate 16; by tightening these screws slide plate 14 exerts an upward force on substrate 20. This pressure compresses substrate 20 against the underside of manifold 12 thus compressing o-rings 28. Preferably, base plate 16 and slide plate pressure 14 are made of a rigid material such as metal, e.g., stainless steel, or hard plastic.

Figure 4:
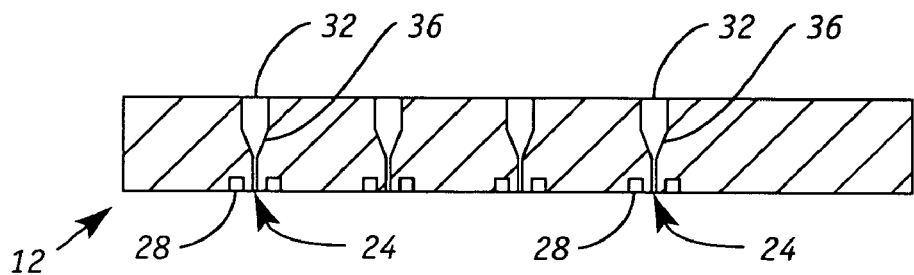
FIG. 4 is a cross sectional view of the manifold section of the device shown in FIGS. 1–3.
Figure 5:
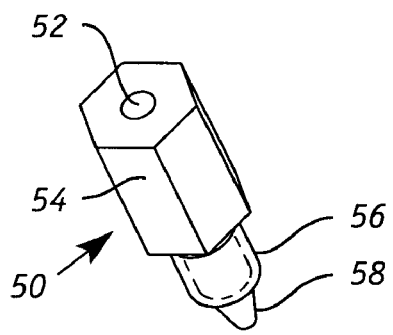
FIGS. 5–8 are various views of a ferrule.
Figure 6:
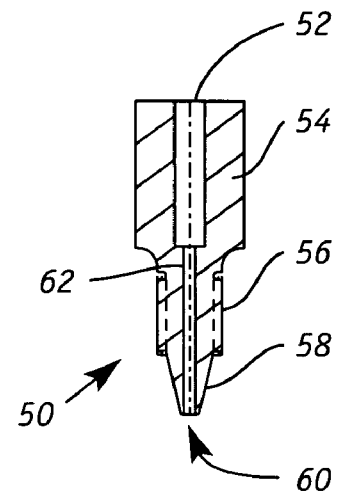

FIGS. 5 and 6 show a threaded ferrule 50 that is designed to be screwed into threaded tapered channel 36 of manifold 12 (FIG. 4). The ferrule includes an upper handle 54, an externally threaded middle portion 56, and a lower tapered end 58. Ferrule 50 also has internal bore 62 that runs the length of the ferrule from inlet 52 to outlet 60. As shown in FIG. 6, internal bore 62 is preferably narrower at the tapered end (as compared to the upper handle) of the ferrule so that while a capillary tube can readily fit into the narrower portion of the bore, the wall of the bore at the tapered end will collapse against the capillary tube as compressive forces are created when the ferrule is screwed into the treaded tapered channel 36 of manifold 12 (FIG. 4). This effectively prevents the capillary tube from extruding during high pressure operations and forms a fluid seal. Preferably each ferrule is constructed as a single, integral piece with no mating sleeve. They can be fabricated by machining a single block of deformable material such as PEEK.

When using external capillaries, one end of the capillary is preferably inserted into bore 62 of ferrule 50 until the end of the capillary tube reaches outlet 60 of the ferrule or slightly beyond outlet 60. The other end of the capillary is connected to a source of regent, solvent, or disposable chamber, as the case may be. In this fashion, one end of the capillary will be adjacent to or inside inlet/outlet port 22 of substrate 20 (FIG. 1). In another one embodiment, rather than connecting the capillary tube to a remote source of materials for the substrate, the source can be a vial or similar container than can be attached directly to the upper handle 54 of ferrule 50.

In practice, after a substrate has been aligned and secured to the edge compression manifold device, one or more ferrule(s) each with a capillary tube inserted therein is screwed into the appropriate threaded tapered channel of the manifold. As the ferrule is screwed on, the compressive pressure causes the internal bore of the ferrule to collapse against the capillary tube thereby gripping the capillary. Once the ferrules are in place, fluid(s) can be transferred into and/or out of the substrate through the capillaries.

Figure 7:
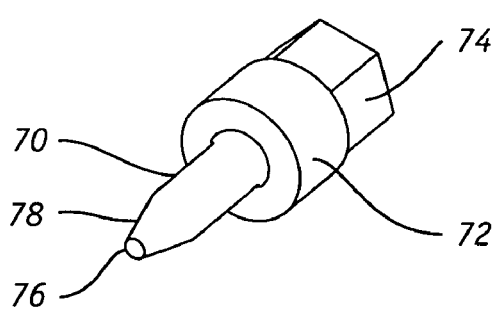
Figure 8:
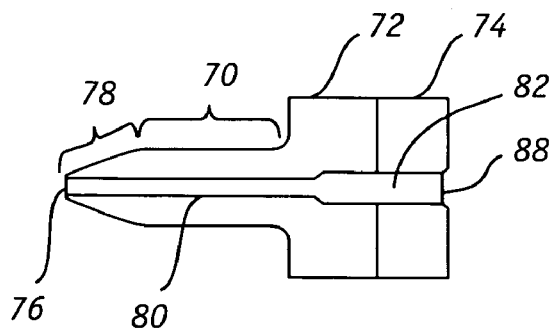

FIGS. 7 and 8 also depict the treaded, one piece ferrule. The ferrule includes an adapter body 72 having an hexagonal nut 74 on one side and an elongated member 70,78 on the other side. End portion 78 of the elongated member is tapered. The ferrule has internal bore 80,82 that runs the length of the ferrule from inlet 88 to outlet 76. Preferably, as shown in FIG. 8, the proximal portion 82 of the bore is broader to facilitate insertion of a capillary tube into the narrower distal portion 80 of the bore. The wall of the bore at the tapered end will collapse directly against the tube as compressive forces are created as the ferrule is screwed into the threaded conical-shaped cavity. This effectively prevents the capillary tube from extruding during high pressure operations and forms a fluid seal.

Each ferrule is machined from a block of material to fabricate a single, integral piece ferrule. The bore is formed using conventional drills and threads are machined preferably on the exterior of the non-tapered portion 70 of the elongated member. When using the ferrule, no flange is needed. In addition, a mating sleeve is not needed since the bore will collapse against the tube under compressive force. By "mating sleeve" is meant an extra tube that is inserted into the bore of the ferrule before the capillary tube that will be transferring a fluid of interest is inserted through the bore of the mating sleeve. Mating sleeves having an outer diameter that matches the inner diameter of prior at ferrules are used quite often but are not needed with the inventive ferrule. Machining permits exact tolerance to be maintained to improve fittings function. Because the ferrules are fabricated by machining, that is, they are not made by molding, a wide range of materials, including plastics, ceramics, and metals, for example, can be used depending on the expected operating conditions, e.g., temperature, pressure, and type of fluids the ferrule will be exposed to. The ferrules are reusable and can be finger-tightened to provide a seal that can withstand a minimum pressure of 5,000 psi.

The ferrule is suited for all pressure operations typically below 5,000 psi to connect capillary tubes in microfluidic applications and therefore the ferrule is dimensioned accordingly. In this regard, referring to the ferrule shown in FIG. 8, the diameter of the distal portion 80 of the bore is preferably 0.0145 in. (0.368 mm) to 0.015 in. (0.38 mm) and the diameter of the proximal portion 82 of the bore is typically 0.018 in. (0.46 mm) to 0.020 in. (0.51 mm).

Preferred capillaries have circular inner diameters that range from 5 microns to 250 microns. Capillaries are available commercially from numerous sources including, for example, Polymicro LLC (Phoenix, Ariz.). The capillary is typically made of glass, metal, silica, or a polymer.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A fluid connector assembly comprising:
at least one fluid conduit;
a manifold comprising one or more channels extending therethrough wherein each channel is at least partially threaded and each channel has a tapered configuration and each channel has an upper aperture and a lower aperture;
one or more externally threaded ferrules each defining a bore extending therethrough with each ferrule supporting a fluid conduit and wherein each ferrule is threaded into a channel of the manifold and wherein each ferrule defines a lower tapered exterior end and wherein each ferrule is an integral structure with no mating sleeve;
a substrate having a network of microchannels and having one or more ports on its upper surface wherein the substrate is positioned below the manifold so that the one or more ports is aligned with the one or more channels of the manifold; and
means for applying an axial compressive force to the substrate to couple the one or more ports of the substrate to a corresponding proximal end of a fluid conduit.

2. The fluid connector assembly of claim 1 comprising:
a base plate that is rigidly fastened to and spaced apart from the manifold and which is positioned below the substrate; and
wherein the means for applying an axial compressive force comprises a pressure plate, which is interposed between the substrate and the base plate, and one or more adjustable screws, which are mounted on the base plate, and which are tightened to maintain an upward axial force on the substrate.

3. The fluid connector assembly of claim 2 wherein the manifold and pressure plate define a slot into which the substrate is positioned and the fluid connector comprises means for positioning the pressure plate.

4. The fluid connector of claim 3 wherein the means for positioning the pressure plate comprises at least one guide pin which is disposed on the base plate.

5. The fluid connector of claim 1 wherein the substrate is a microfluidic device.

6. The fluid connector of claim 1 wherein each fluid conduit comprises a capillary tube having an inner diameter that ranges from 5 to 250 microns.

7. The fluid connector of claim 1 wherein a lower surface of the manifold defines one or more lower apertures and the lower surface adjacent each lower aperture defines an annular groove that contains a seal material around the lower aperture.

8. The fluid connector of claim 7 wherein the seal material is an o-shaped ring made of a material selected from the group consisting of rubber and silicone.

9. The fluid connector assembly of claim 1 wherein each threaded ferrule is made of a deformable material.

10. The fluid connector assembly of claim 1 wherein a portion of each ferrule is sufficiently compressed against a part of a fluid conduit to form a fluid tight seal.

11. The fluid connector assembly of claim 1 wherein each ferrule comprises an adapter body having a nut on one side and having an elongated member on the other side and wherein the bore extends through the adapter body, nut and elongated member.

12. The fluid connector assembly of claim 11 wherein the lower tapered exterior end is on the elongated member.

13. The fluid connector assembly of claim 11 wherein the part of the bore that extends through the nut has a diameter that is larger than the part of the bore that extends through the elongated member.

14. The fluid connector assembly of claim 1 wherein each channel defines a conical-shaped cavity.

15. The fluid connector assembly of claim 1 wherein the means for applying the axial compressive force enables the fluid connector to operate at a pressure of at least about 500 psi.

16. The fluid connector assembly of claim 1 wherein each ferrule comprises an upper handle, and externally threaded portion, and wherein the bore extends through the upper handle, externally threaded portion, and the lower tapered exterior end.

17. The fluid connector assembly of claim 16 wherein the part of the bore that extends through the tapered end has a diameter that is narrower than the part of the bore that extends through the handle.

18. A fluid connector assembly comprising:
at least one fluid conduit;
a manifold comprising one or more channels extending therethrough wherein each channel is at least partially threaded and each channel has a tapered configuration and each channel has an upper aperture and a lower aperture;
one or more externally threaded ferrules each defining a bore extending therethrough with each ferrule supporting a fluid conduit wherein each ferrule is threaded into a channel of the manifold and wherein each ferrule defines a lower tapered exterior end and wherein a portion of each ferrule is sufficiently compressed against a part of a fluid conduit to form a fluid tight seal;
a substrate having a network of microchannels and having one or more ports on its upper surface wherein the substrate is positioned below the manifold so that the one or more ports is aligned with the one or more channels of the manifold; and
means for applying an axial compressive force to the substrate to couple the one or more ports of the substrate to a corresponding proximal end of a fluid conduit.

19. The fluid connector assembly of claim 18 comprising:
a base plate that is rigidly fastened to and spaced apart from the manifold and which is positioned below the substrate; and
wherein the means for applying an axial compressive force comprises a pressure plate, which is interposed between the substrate and the base plate, and one or more adjustable screws, that are mounted on the base plate, and which are tightened to maintain an upward axial force on the substrate.

20. A fluid connector assembly comprising:
at least one fluid conduit;
a manifold comprising one or more channels extending therethrough wherein each channel is at least partially threaded and each channel has a tapered configuration and each channel has an upper aperture and a lower aperture;
one or more externally threaded ferrules each defining a bore extending therethrough with each ferrule supporting a fluid conduit wherein each ferrule is threaded into a channel of the manifold and wherein each ferrule defines a lower tapered exterior end and wherein each ferrule comprises an adapter body having a nut on one side and having an elongated member on the opposite side and wherein the bore extends through the adapter body, nut and elongated member;
a substrate having a network of microchannels and having one or more ports on its upper surface wherein the substrate is positioned below the manifold so that the one or more ports is aligned with the one or more channels of the manifold; and
means for applying an axial compressive force to the substrate to couple the one or more ports of the substrate to a corresponding proximal end of a fluid conduit.

21. The fluid connector assembly of claim 20 comprising:
a base plate that is rigidly fastened to and spaced apart from the manifold and which is positioned below the substrate; and
wherein the means for applying an axial compressive force comprises a pressure plate, which is interposed between the substrate and the base plate, and one or more adjustable screws, that are mounted on the base plate, and which are tightened to maintain an upward axial force on the substrate.

22. A fluid connector assembly comprising:

at least one fluid conduit;

a manifold comprising one or more channels extending therethrough wherein each channel is at least partially threaded and each channel has a tapered configuration and each channel has an upper aperture and a lower aperture;

one or more externally threaded ferrules each defining a bore extending therethrough with each ferrule supporting a fluid conduit wherein each ferrule is threaded into a channel of the manifold and wherein each ferrule defines a lower tapered exterior end and wherein each ferrule comprises an upper handle, an externally threaded portion, and wherein the bore ferrule extends through the upper handle, externally threaded portion, and the lower tapered exterior end;

a substrate having a network of microchannles and having one or more ports on its upper surface wherein the substrate is positioned below the manifold so that the one or more ports is aligned with the one or more channels of the manifold; and means for applying an axial compressive force to the substrate to couple the one or more ports of the substrate to a corresponding proximal end of a fluid conduit.

23. The fluid connector assembly of claim 22 comprising:

a base plate that is rigidly fastened to and spaced apart from the manifold and which is positioned below the substrate; and wherein the means for applying an axial compressive force comprises a pressure plate, which is interposed between the substrate and the base plate, and one or more adjustable screws, that are mounted on the base plate, and which are tightened to maintain an upward axial force on the substrate.

24. A fluid connector assembly comprising:

at least one fluid conduit;

a manifold comprising one or more channels extending therethrough wherein each channel is at lest partially threaded and each channel has a tapered configuration and each channel has an upper aperture and a lower aperture and wherein concentric with each lower aperture on a lower surface of the manifold is an annular groove that contains a seal material that provides a fluid tight seal around each lower aperture;

one or more externally threaded ferrules each defining a bore extending therethrough with each ferrule supporting a fluid conduit wherein each ferrule is threaded into a channel of the manifold and wherein each ferrule defines a lower tapered exterior end;

a substrate having a network of microchannels and having one or more ports on its upper surface wherein the substrate is positioned below the manifold so that the one or more ports is aligned with the one or more channels of the manifold; and means for applying an axial compressive force to the substrate to couple the one or more ports of the substrate to a corresponding proximal end of a fluid conduit.

25. The fluid connector assembly of claim 24 comprising:

a base plate that is rigidly fastened to and spaced apart from the manifold and which is positioned below the substrate; and wherein the means for applying an axial compressive force comprises a pressure plate, which is interposed between the substrate and the base plate, and one or more adjustable screws, that are mounted on the base plate, and which are tightened to maintain an upward axial force on the substrate.

* * * * *